United States Patent
Salvi

[15] 3,663,953
[45] May 16, 1972

[54] HELICOPTER CARRIED MAGNETOMETER ASSEMBLY COMPENSATED FOR THE PARASITIC FIELD OF THE HELICOPTER

[72] Inventor: Antoine Salvi, Fontaine, France

[73] Assignee: Commissariat A L'Energie Atomique, Paris, France

[22] Filed: Sept. 17, 1970

[21] Appl. No.: 73,106

[52] U.S. Cl. .............................................. 324/43 R, 324/4
[51] Int. Cl. ........................................................ G01r 33/02
[58] Field of Search ........................ 324/43 R, 47, 4, 8, .5 E

[56] References Cited

UNITED STATES PATENTS

| | | | |
|---|---|---|---|
| 2,706,801 | 4/1955 | Tolles.................................. | 324/43 R |
| 3,123,766 | 3/1964 | Ruddock et al............................ | 324/4 |
| 3,263,161 | 7/1966 | Ruddock et al............................ | 324/8 |
| 3,441,841 | 4/1969 | Salvi et al................................ | 324/43 R |

Primary Examiner—Rudolph V. Rolinec
Assistant Examiner—R. J. Corcoran
Attorney—Cameron, Kerkam & Sutton

[57] ABSTRACT

A magnetometer assembly for detection of ferromagnetic targets carried by a helicopter is compensated for the parasitic magnetic field generated by the helicopter. First and second magnetometer heads are carried by the helicopter and located at points aligned with the axis of the main rotor. An electric control signal representative of the difference of the total magnetic fields at the first and second heads is obtained and is used to compensate the parasitic component due to the helicopter in the magnetic field at one of the points. The distance between the heads and the rotor is large as compared to the variations of the position of the magnetic center of gravity of the helicopter and as compared to the distance between the heads.

9 Claims, 2 Drawing Figures

Patented May 16, 1972
3,663,953
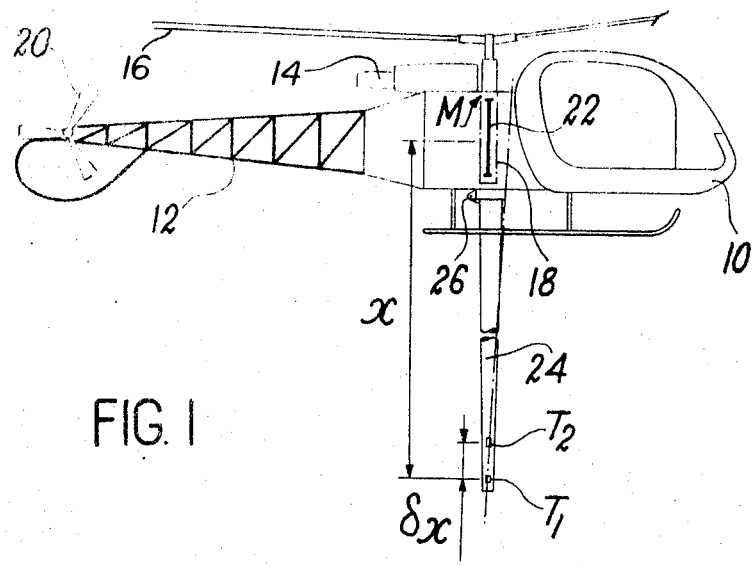
FIG. 1
FIG. 2
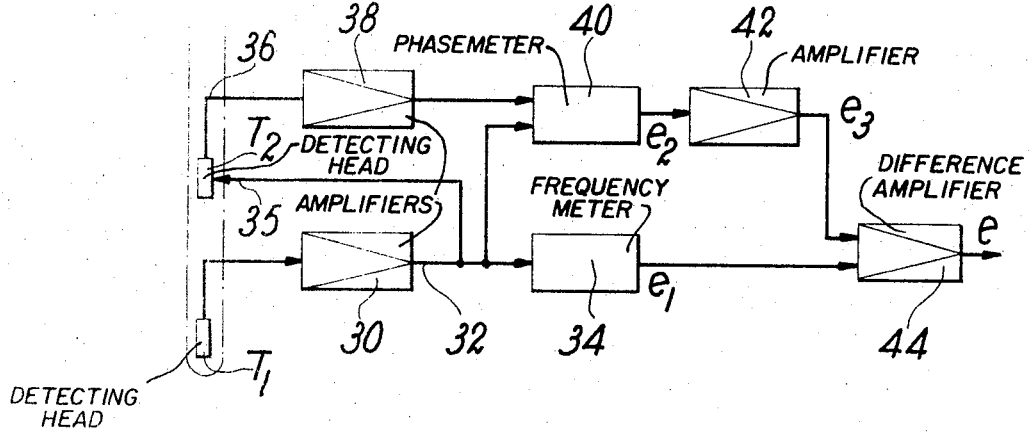

HELICOPTER CARRIED MAGNETOMETER ASSEMBLY COMPENSATED FOR THE PARASITIC FIELD OF THE HELICOPTER

The invention relates to compensation of the parasitic magnetic fields associated with a helicopter transporting a high-precision magnetometer and has for an object to eliminate disturbances in the measurement of the earth's magnetic field resulting from the parasitic magnetic fields due to the helicopter (in particular, the permanent fields and the fields induced by the ferromagnetic masses).

Various methods and devices for compensating parasitic magnetic fields associated with aircraft carrying magnetometers already exist. According to a prior art method the difference between the values of the magnetic field at two points for which the external magnetic field intensity is substantially the same (whereas the intensities of the parisitic magnetic fields due to the aircraft are different) is measured and processed to produce a control signal proportional to this difference and therefore to the parasitic magnetic fields. Among these methods, that described in U.S. Pat. No. 3,441,841 uses the control signal, in the form of an electric DC variable current, to produce a compensating magnetic field whose direction is opposite to that of the parasitic magnetic field, and which tends to cancel the said difference.

In another prior art method, which has been described in pending U.S. Pat. application Ser. No. 866,501 assigned to the assignee of the present invention, a correction signal is introduced by means of an electronic circuit into the output of the apparatus measuring the magnetic field at one of the points. This second method has over the first the advantage of less background noise, due to the absence of compensating coils permanently carrying electric current.

When the methods just described are applied to an aircraft, the field difference between two points aligned along the axis of roll of the aircraft and determined by two magnetometer heads provided in a tail extension (tail-boom) is measured, as is the absolute value for the field at one of the points. This arrangement is difficult to apply to a single-rotor helicopter because of the tail rotor; also, pilots do not appreciate having such an extension projecting in front of the cockpit, since it reduces visibility. So far, therefore, magnetometer prospecting with helicopters has been carried out by placing the magnetometer in a pod trailing on a non-magnetic cable between 50 and 100 m long. This solution has many disadvantages. In particular, it requires a winch on board the helicopter and involves complex and somewhat dangerous maneuvering when the cable is unwound after take-off and wound in before landing.

Magnetic research carried out on helicopters with a single main rotor has shown that the chief magnetic anomaly is due to the rotor shaft, to the extent that at a few meters from the helicopter the magnetic masses of the latter are relatively exactly comparable to a dipole coaxial with the shaft of the main rotor. This property can probably be attributed to the fact that the shaft, made from very hard steel, really acts as a magnet, and the effect of this magnet masks that of the remainder of the helicopter from the magnetic point of view.

An object of the invention is to provide a method of compensating parasitic magnetic fields associated with a helicopter sufficiently well for a high-precision magnetometer to be mounted on the helicopter and give results undisturbed by parasitic fields (permanent fields and fields induced by the ferromagnetic masses of the helicopter).

To this end, the invention provides a method in which the total magnetic field difference between two points connected to the helicopter and separated by a distance which is small compared with their distance from the barycenter of the magnetic masses of the helicopter, the latter distance being large compared with the shifts of this barycenter during maneuvering and changes in the loading of the helicopter, a control magnitude is produced which is proportional to the said difference, and the parasitic component due to the helicopter in the magnetic field determined at one of the said points is compensated using the control magnitude, characterized particularly in that the said points are aligned on an axis which coincides with that of the rotor shaft. In practice, this method will lead to the use of a device having two magnetometer heads situated in a tube of non-magnetic material fixed beneath the helicopter and in an extension of the axis of the rotor shaft, that is to say, in a substantially vertical direction.

It should be noted that the invention is applicable to nuclear magnetic resonance magnetometers having either compensation by means of coils, like those described in the above-mentioned U.S. patent specification, or "electronic" compensation of the type described in pending U.S. Pat. application Ser. No. 866,501, and to magnetometers of any other type. Also, on helicopters with a digital computer on board, it is possible to digitize the output signals representing the total magnetic field at one of the points and the difference between the magnetic fields at the two points, by means of analog-to-digital converters (such as a digital frequency meter, where measurement of the field amounts to a frequency measurement, or a digital voltmeter with a large enough number of decades), and to supply these data to the computer, which operates in real time. This solution has the additional advantage, in the case of magnetometers subjected to other disturbing actions (such as the gyromagnetic effect which produces an error in measurements carried out with nuclear magnetic resonance magnetometers), of being able to apply the corresponding correction factor, also using signals from the rate gyros included in the navigational equipment of the helicopter.

In general, the method and device defined above can be used with any high-precision magnetometer, for example optical pumping magnetometers or nuclear magnetic resonance magnetometers such as that described in the above-mentioned U.S. patent specification. The method and device are suitable whether the magnetometer is intended to provide magnetic mapping of the terrain flown over (and therefore to give a precise indication of the absolute value for the magnetic field) or to detect disturbances in the earth's magnetic field. In the latter case, in which the magnetometer is associated with means for eliminating the continuous or very slowly varying component of the field, the invention is in fact particularly useful, since highly sensitive detection is required rather than precise measurement of the field variations in space. In this case it is desirable to make the distance between the points at which the field difference is measured such that, when there are appreciable magnetic anomalies in the zones flown over, it is no longer possible to consider that the external magnetic field intensity is exactly the same for the two points.

The magnetic anomaly due to the earth will in fact provide, between two points aligned vertically beneath the helicopter, a total field module difference opposite to that due to the helicopter. This opposite difference will produce a signal which will cause the measuring result to have a value greater than the actual value for the disturbance, and, in other words, will amplify variations and facilitate detection of them. The device measuring the total field difference between the two points is incapable of determining the cause of this difference, and it applies the correction factor to the measurement whether the difference is due to the helicopter carrying it or to external disturbances.

This arrangement has other, related advantages. For example, the variation in the vertical gradient when passing over a magnetic anomaly, and therefore the amplification, will be at a maximum when the lines of force of the earth's field approach the horizontal, that is to say, in conditions for which the variation in the disturbance due to an anomaly is slowest.

The invention will be better understood from the following description of a particular embodiment, given by way of example only and using a nuclear magnetic resonance magnetometer and electronic compensation of the type described in U.S. Pat. application Ser. No. 866,501.

The description refers to the accompanying drawings, in which:

FIG. 1 illustrates very diagrammatically a helicopter with a vertical tube containing the two heads, situated at the points between which the field difference is measured; and FIG. 2 is a basic diagram for the detecting and compensating circuit.

FIG. 1 is a very diagrammatic side elevation of a helicopter with a cockpit 10, a fuselage of which the rear consists simply of a metal lattice girder 12, and a turbine 14 for driving a main rotor 16 mounted on a shaft 18. The gyroscopic torque of the main rotor 16 is balanced by means of a tail propeller 20. Measurements carried out on helicopters of this type have shown that at a distance of a few meters the effect of the magnetic masses of the helicopter is comparable at least below the helicopter, to the effect of a dipole 22, the direction of whose magnetic moment $\vec{M}$ is identical to that of the axis of the shaft 18.

According to the invention, the helicopter is equipped with a magnetometer assembly comprising two detecting heads: a head situated at a distance $x - \delta x$ from the dipole and hereinafter termed the compensating head $T_2$; and a head situated at a distance $x$, hereinafter termed the detecting head $T_1$.

According to a first feature of the invention, the two heads $T_2$ and $T_1$ are situated on a line which extends the axis of the rotor shaft 18 and therefore the dipole 22. In other words, the two heads are both situated in the first Gaussian principal position. Also, $x$ is given a value distinctly greater than the length of the dipole to which the helicopter is comparable, and $\delta x$ is given a value distinctly less than $x$. The values for the magnetic field at the points occupied by the heads $T_1$ and $T_2$ can therefore be regarded as including two terms, one corresponding to the earth's magnetic field and the other to the disturbances due to the helicopter, that is, the disturbances due to the dipole 22.

Using the same notation as above, the disturbing fields $\Delta H_1$ and $\Delta H_2$ acting on the heads $T_1$ and $T_2$ are respectively:

$$\Delta H_2 = \frac{1}{2\pi} \frac{\vec{M}}{(x-\delta x)^3}$$

$$\Delta H_1 = \frac{1}{2 \cdot \pi} \frac{\vec{M}}{x^3}$$

Since $\delta x$ is small compared with $x$, the difference $\Delta H_1 - \Delta H_2$ may be written:

$$\Delta H_1 - \Delta H_2 = -\vec{M}/2\pi \cdot 3 dx/x^4$$

or $$\Delta H_1 - \Delta H_2 = -\frac{3\delta x}{x} \cdot \Delta H_1 \quad (1)$$

and $$\Delta H_1 = \frac{\Delta H_2 - \Delta H_1}{3\delta x} x$$

The difference $\Delta H_2 - \Delta H_1$ between the parasitic magnetic fields at the points occupied by the heads $T_2$ and $T_1$ will be equal to the difference between the magnetic fields measured by the heads $T_2$ and $T_1$ when the two heads are sufficiently close for the earth's magnetic field to have the same value at the two points. With this hypothesis, it is possible to deduce from $\Delta H_2 - \Delta H_1$ a control magnitude proportional to the disturbance $\Delta H_1$ caused by the helicopter at the head $T_1$, and to use it to compensate the disturbance.

In practice, the heads $T_1$ and $T_2$ will be placed in a nonmagnetic tube 24 beneath the helicopter. In particular, the tube may be made of glassfiber-reinforced synthetic plastic material. The tube must, of course, be retracted before landing. For this purpose it may be designed to swivel around a flange 26 attached to the bottom of the cockpit. The tube can then be situated directly in the extension of the rotor shaft when in use. Alternatively, a telescopic tube may be used, but in this case the tube cannot be placed exactly along the axis. Its fixed upper portion, into which the extensible portions retract, will be offset relative to the rotor shaft and so positioned and directed that the lower portion containing the heads is substantially in line with the shaft. By way of example, the axis of a tube of this kind is indicated by chainlines in FIG. 1.

On a single-rotor helicopter of the size of an "Alouette II," for example, there could be three telescopic portions 2.50 m long, which would project about 7.50 m beneath the cockpit floor, and the distance between the two heads could be of the order of 1 m. More generally, the distance $x$ will be between 7 and 10 m and the distance $\delta x$ will be between 0.5 and 1 m ($\delta x/x$ between 1/20 and 1/7).

As already indicated, the compensation based on the control magnitude determined by finding $\Delta H_2 - \Delta H_1$ can be carried out by various methods. By way of example, FIG. 2 gives a basic circuit diagram for a device for carrying out the method described in U.S. Pat. application Ser. No. 866,501 and illustrated in FIG. 5 of this Application.

Head $T_1$ forms, with a loop amplifier 30 and associated components (not shown), a spin oscillator of the type described in U.S. Pat. No. 3,249,856, and provides at its output 32 an alternating signal whose frequency is directly proportional to the intensity $H_1$ of the total magnetic field at the point occupied by the detecting head $T_1$. This signal, which is amplified in the loop amplifier 30, is applied to a frequency meter 34, which supplies at its output a voltage: $e_1 = k_1 \cdot H_1$.

The compensating head $T_2$, on the other hand, operates as a nuclear filter. Its input 35 is connected to the output from the amplifier 30, and the signal obtained at its output 36 is out of phase with the input signal. This output signal is fed to an amplifier 38. The output voltages from the amplifiers 30, 38 are applied to the input of a phasemeter 40, which provides at its output a voltage proportional to the phase shift between its input voltages, at least in the case of slight phase shifts. The output voltage $e_2$ of the phase meter is therefore linked to the field intensities $H_1$ and $H_2$ at the points occupied by the heads $T_1$ and $T_2$ by the relation:

$$e_2 = k_2 (H_2 - H_1).$$

Preferably, the frequency meter used is such that $k_2 = k_1 = k$. If, also, the earth's field has the same value $H_0$ at the points occupied by the heads $T_1$ and $T_2$, we have $$e_2 = k (\Delta H_2 - \Delta H_1).$$

As a result, compensation is carried out by amplifying $e_2$ at a ratio equal to $x/3\delta x$ in a variable-gain amplifier 42 and subtracting the voltage $e_3$ so obtained from the voltage $e_1$. This operation is carried out in a difference amplifier 44, whose output provides a voltage $e$ proportional to the field intensity $H_0$: $e = kH_0$.

Obviously, the control magnitude could equally well be used to automatically control the current flowing in compensating coils provided substantially at the barycenter of the magnetic masses of the aircraft (at the center of the dipole 22), using the method described in U.S. Pat. No. 3,441,841, or in two coils placed around each of the heads.

The preceding description assumes that the values for the earth's magnetic field at the points occupied by the heads $T_1$ and $T_2$ are equal. In fact, when the purpose of the magnetometer is to detect anomalies in the earth's field instead of carrying out absolute measurements of this field, it is preferable to move the heads further from the helicopter and to make the distance $\delta x$ such that this hypothesis is not completely respected, at least if the field is disturbed by local magnetic anomalies. The advantages of this arrangement are obvious if one realizes that the compensating device is incapable of distinguishing the origin of the gradient between the two heads and applies a correction coefficient proportional to the field difference existing. As the altitude increases, the undisturbed terrestrial field decreases by about 1 gamma every 30 m at average latitudes, and its gradient is therefore opposite to that due to the helicopter, but substantially constant. By contrast, a localized magnetic anomaly will, when flown over, produce a rapid variation with time in a gradient of direction opposite to that due to the helicopter: the compensating device will tend not to compensate it, but to amplify it.

This amplification can be worked out approximately by using a simplifying hypothesis, consisting in admitting that the helicopter, comparable to a vertical dipole $\vec{M}$ and equipped with two heads at distances $x$ and $x-\delta x$ from the dipole, passes at a height $z$ above an object which, also, is comparable to a vertical dipole $\vec{M}$. This case approximates to that of a submarine remaining in one hemisphere and magnetized by influence in the earth's magnetic field. The effect at a distance is in fact comparable to that of a horizontal dipole and a vertical dipole $\vec{M}$ situated at the level of the conning tower.

The simplified calculation made above shows that we have approximately:

$$\Delta H_1 = \frac{1}{2\pi} \cdot \frac{M}{x^3}$$

$$\Delta H_1 - \Delta H_2 = \frac{3}{2\pi} M \frac{\delta x}{x^4}$$

In these formulas, which apply if $\delta x << x$, $\Delta H_1$ and $\Delta H_2$ designate the disturbances created by the helicopter at the heads.

To compensate the $\Delta H_1$ action of the helicopter at the detecting head, the compensating system creates a control magnitude equal to $\Delta H_1$ and obtained from $\Delta H_1$ and $\Delta H_2$, which at first are assumed to be due solely to the helicopter.

$$\Delta H_1 = \frac{x}{3\delta x} \cdot (\Delta H_2 - \Delta H_1)$$

The order of magnitude of this correction can be estimated. At 7 m beneath a single-rotor helicopter such as the "Alouette II," the field module difference between two heads 1 m apart is between $0.3\gamma$ and $0.4\gamma$, which becomes a $\Delta H_1$ correction of the order of $0.7\gamma$.

As for the effects $\delta H_1$ and $\delta H_2$ of the vertical dipole $\vec{M}$ formed by the submarine, they are linked by the equations:

$$\delta H_1 = \frac{1}{2\pi} \cdot \frac{M}{z^3}$$

$$\delta H_1 - \delta H_2 = -\frac{3\delta x}{z} \cdot \delta H_1$$

$$\delta H_1 - \delta H_2 = \frac{3}{2\pi} M \frac{\delta x}{z^4}$$

The compensating circuit works out a correcting magnitude:

$$(\Delta H_1)_0 = \frac{1}{3\delta x/x} (\delta H_1 - \delta H_2) = \frac{1}{3\delta x/x} \cdot 3 \frac{\delta x}{z} \delta H_1$$

that is:

$$(\Delta H_1)_0 = \frac{x}{z} \delta H_1$$

and the variation measurement provided by the amplifier 44 corresponds, in fact, not to a value $\delta H_1$ but to $\delta H_1 + (\Delta H_1)_0$, that is, to $\delta H_1 (1 + x/z)$. In other words, the variation, that is, the signal, is amplified in a ratio of the order of $1 + x/z$: If $x = 8$ m and $z = 150$ m, the amplification coefficient is of the order of 0.5 percent. This is the case when a helicopter patrolling at 70 m passes over a submarine at a depth of 90 m.

However, a helicopter may fly at an altitude lower than that just mentioned, which is used by patrolling aircraft only for reasons of safety. If the helicopter is at 30 m and the submarine at a depth of 60 m, the amplification is approximately 1.10 percent.

The existence of this coefficient is the more interesting because the coefficient decreases if the dipole is deeper, reducing the incidence of background anomalies compared with the anomalies sought. This property is particularly useful above the continental shelf, where it is difficult to distinguish the effects of ferromagnetic masses on the surface from those of submerged masses.

I claim:

1. A method of compensating a magnetometer system carried by a helicopter having a single main rotor for parasitic magnetic fields associated with the helicopter, the steps of measuring the difference between the magnetic fields at two points connected to the helicopter and separated by a distance which is small compared with their distance from the barycenter of the magnetic masses of the helicopter, the latter distance being large compared with the amplitude of the displacements of said barycenter during maneuvering and changes in the loading of the helicopter, deriving from said difference an electric control signal proportional to the said difference, and compensating the parasitic component due to the helicopter in the magnetic field measured at one of the said points using the control signal, wherein said points are aligned on an axis which coincides with that of the rotor shaft.

2. A method as claimed in claim 1, wherein compensation is carried out by adjusting automatically and in proportion to the control signal a DC electric current in compensating coils situated substantially at the barycenter of the magnetic masses of the helicopter.

3. A method as claimed in claim 1, wherein compensation is carried out by multiplying said control signal by a predetermined value representing the ratio between the parasitic field at one of said points and said difference, and by subtracting the electric signal so obtained from an electric signal representing the field at one of said points.

4. A magnetometer assembly for a helicopter having a single main rotor carried by a shaft, said assembly being compensated for the parasitic magnetic field generated by the helicopter, comprising a first and a second magnetometer head carried by the helicopter, means for providing a signal representative of the value of the total magnetic field sensed by the first head, means for determining the difference between the respective values of the total magnetic field sensed by the first and second heads, means for generating a control voltage in direct proportion with said difference, and means responsive to said control voltage for modifying said signal, wherein the improvement consists in that the first head and the second head are located at points aligned with the axis of the shaft of said rotor, the length between each of said points and the shaft being large as compared to the variations of the position of the magnetic center of gravity of the helicopter and as compared to the length between the first head and the second head.

5. An assembly according to claim 4, wherein the said heads are situated in a tube of non-magnetic material fixed beneath the helicopter and in an extension of the axis of the rotor shaft.

6. A magnetometer assembly according to claim 5, wherein the tube is pivotally connected to the helicopter around a flange mounted on the floor thereof.

7. A magnetometer assembly according to claim 5, wherein the tube is telescopic and the lower portions can be extended from a fixed upper portion offset relative to the rotor shaft and so positioned angularly that the lower portion containing the heads is substantially in line with the shaft.

8. A magnetometer assembly as claimed in claim 4, for detecting anomalies in the earth's magnetic field, characterized in that the distances $x$ between the heads and the rotor shaft and $\delta x$ between the two heads are such that the values for the earth's magnetic field disturbed by the anomalies are not equal at the level of the two heads.

9. A device as claimed in claim 8, wherein $x$ is between 7 and 10 m and $\delta x$ is between 0.5 and 1 m.

* * * * *